United States Patent
Kitagawa et al.

(10) Patent No.: US 6,295,138 B1
(45) Date of Patent: Sep. 25, 2001

(54) ELECTRONIC IMAGE SENSING APPARATUS

(75) Inventors: Shuji Kitagawa, Ibaraki; Toshihiro Sasai, Kyoto; Fumitaka Okamoto, Ibaraki, all of (JP)

(73) Assignee: NuCORE Technology, Inc., Santa Clara, CA (US)

( * ) Notice: Subject to any disclaimer, the term of this patent is extended or adjusted under 35 U.S.C. 154(b) by 0 days.

(21) Appl. No.: 09/259,180

(22) Filed: Feb. 25, 1999

(30) Foreign Application Priority Data

Feb. 3, 1998 (JP) .................................... 10-049432

(51) Int. Cl.$^7$ ............................. H04N 1/04; G06R 15/00
(52) U.S. Cl. .......................... 358/1.9; 358/520; 358/475
(58) Field of Search .................................... 358/509, 520, 358/475, 1.9; 345/147

(56) References Cited

U.S. PATENT DOCUMENTS 5,977,946 * 11/1999 Mizobata ............................. 345/112

FOREIGN PATENT DOCUMENTS

08328147A * 12/1996 (JP) .............................. G03B/21/00

11298794 * 10/1999 (JP) .............................. H04N/5/243

OTHER PUBLICATIONS

Home Video Systems Visual Resolution Comparison; www.cs.tut.fi/~leopold/LD/ResolutionComparison.*

* cited by examiner

Primary Examiner—Jerome Grant, II
(74) Attorney, Agent, or Firm—Townsend and Townsend and Crew LLP; Kenneth R. Allen

(57) ABSTRACT

An electronic image sensing apparatus for photoeletrically converting an optical image in an image sensing unit, processing the resultant analog image sensing data, and recording, displaying, outputting, or externally outputting the processed image sensing data includes an analog semiconductor memory, a processor, and a luminance distribution adjustment unit. The analog semiconductor memory temporarily stores the image sensing data from the image sensing unit in the form of an analog value. The processor generates adjustment information for adjusting a luminance distribution of the entire image sensing data on the basis of luminance information of the image sensing data read out from the analog semiconductor memory. The luminance distribution adjustment unit adjusts the luminance distribution of the entire image sensing data from the analog semiconductor memory on the basis of the adjustment information generated by the processor.

9 Claims, 12 Drawing Sheets

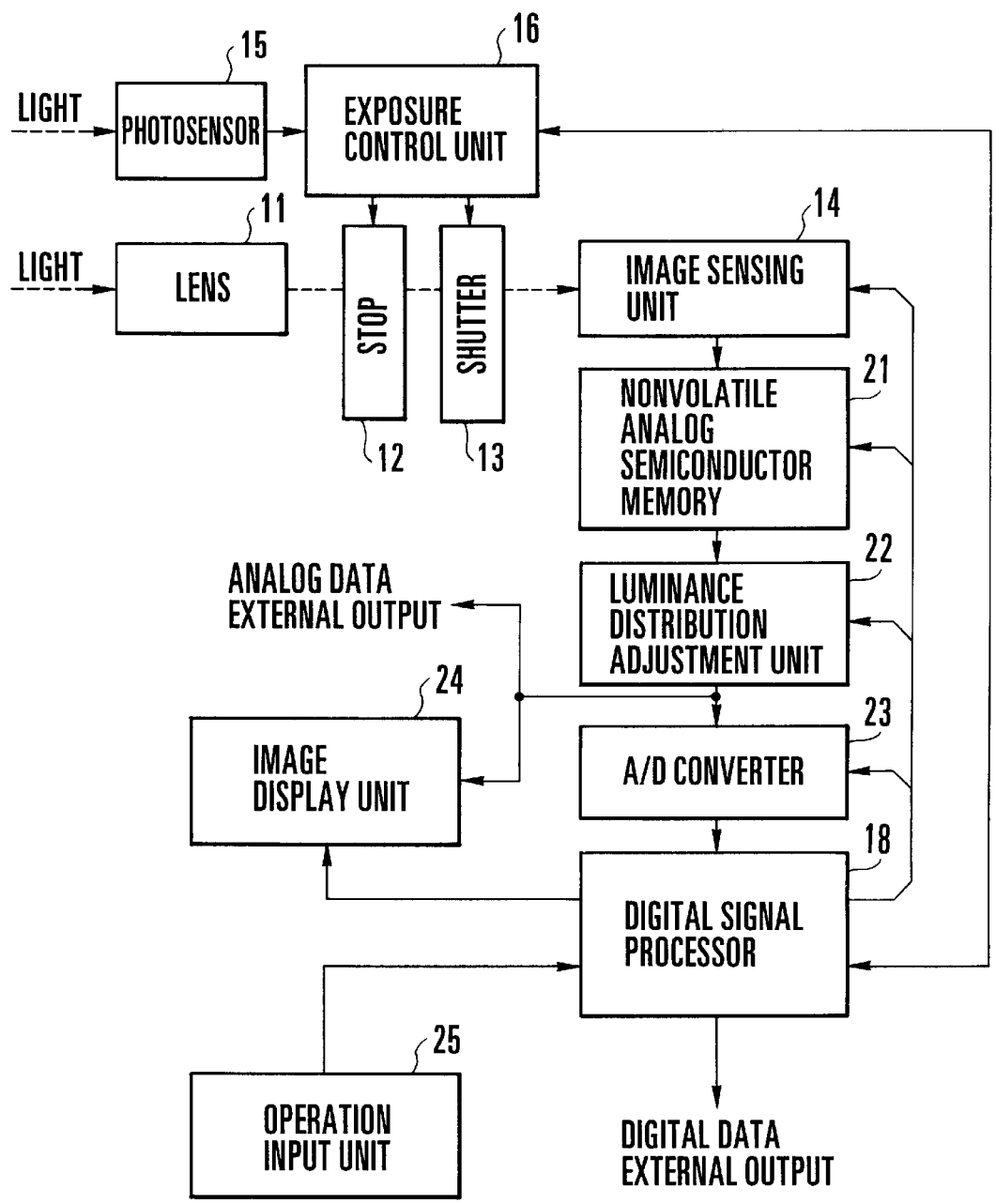
F I G. 2

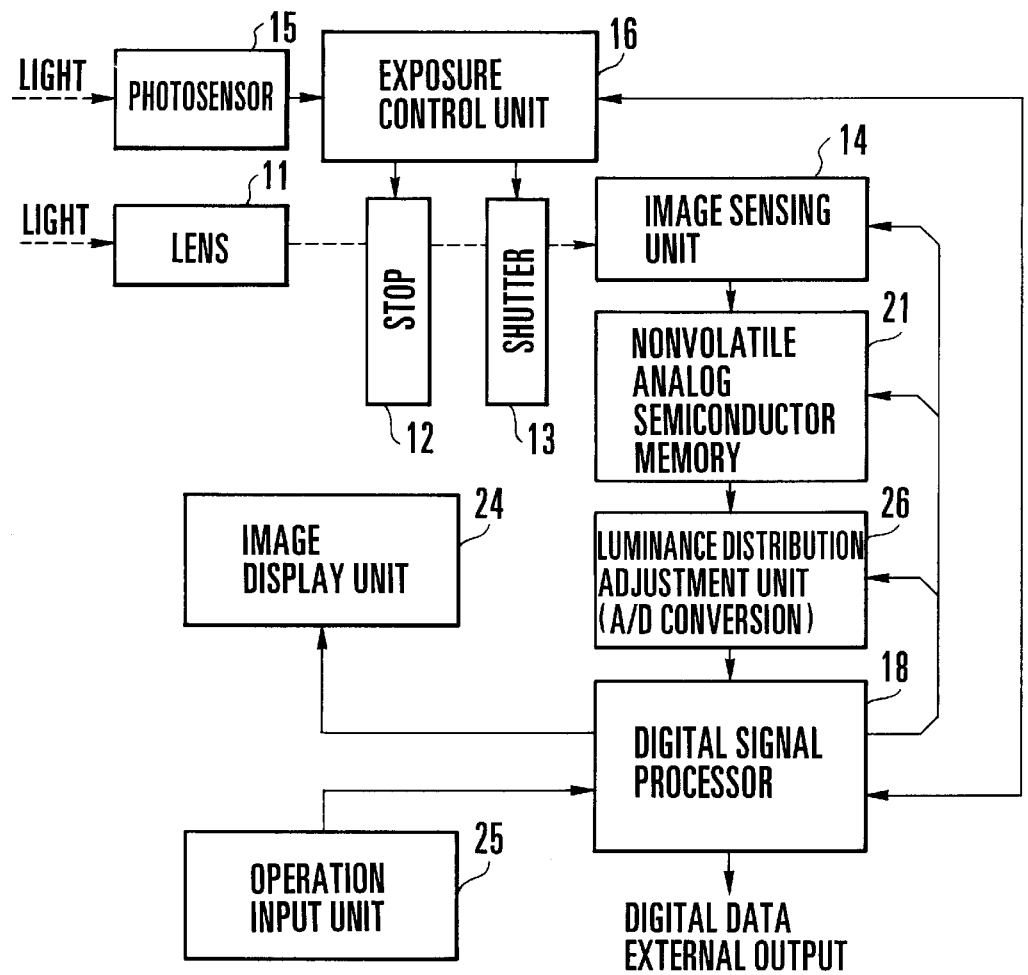
F I G. 5 A
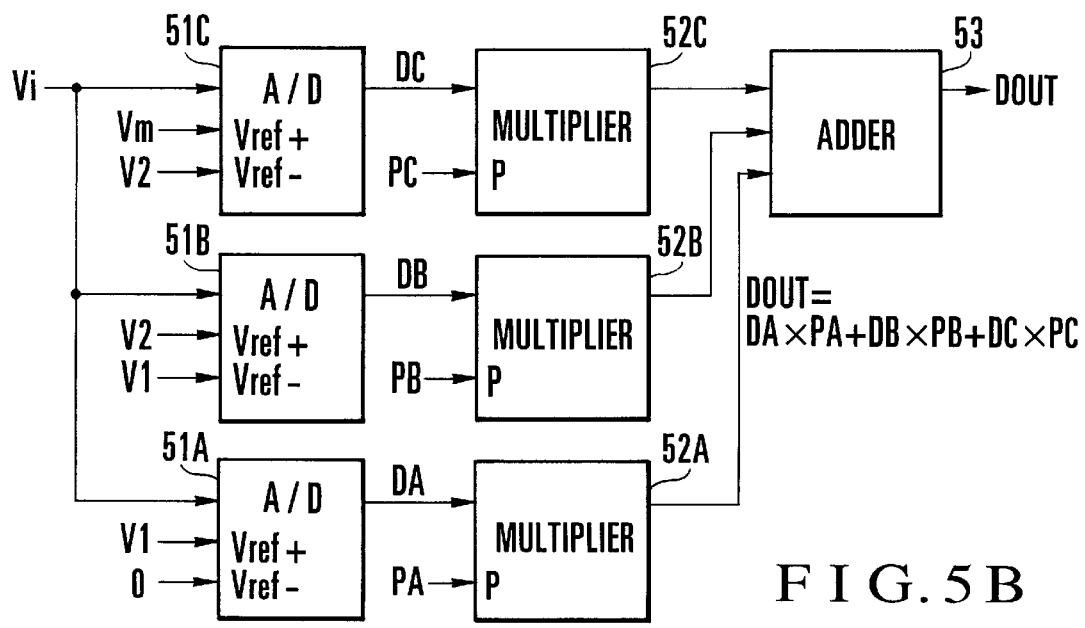
F I G. 5 B

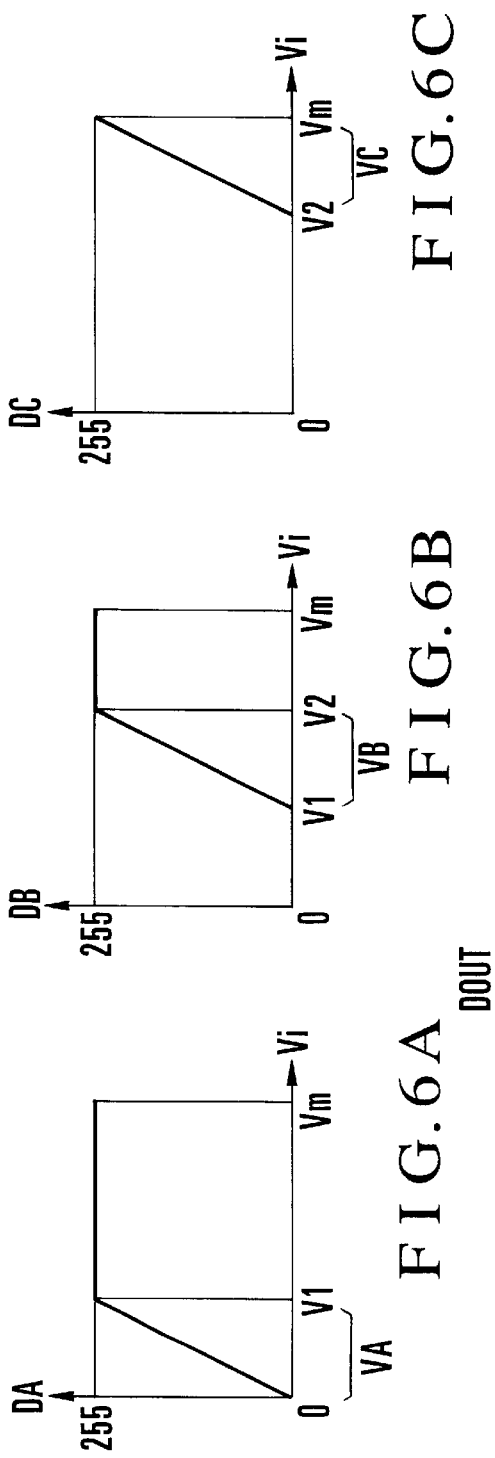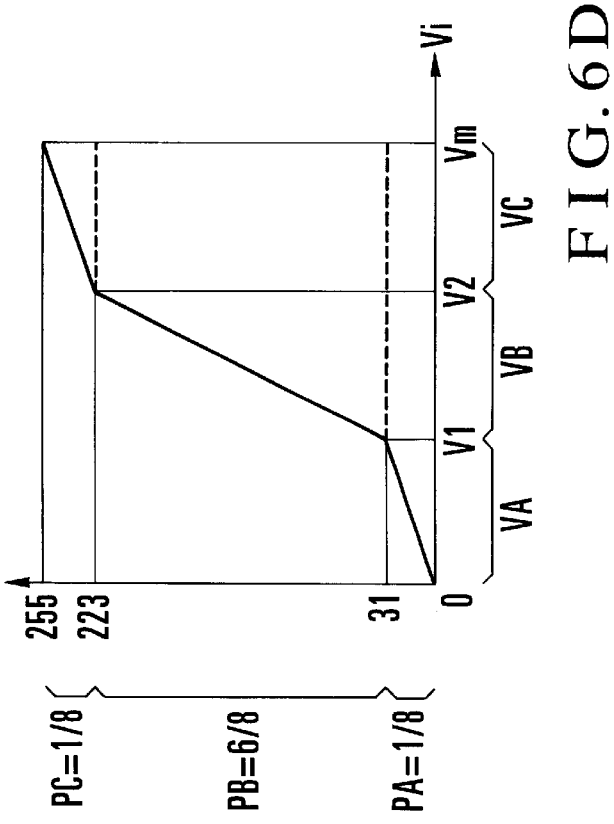
FIG.6A  FIG.6B  FIG.6C  FIG.6D

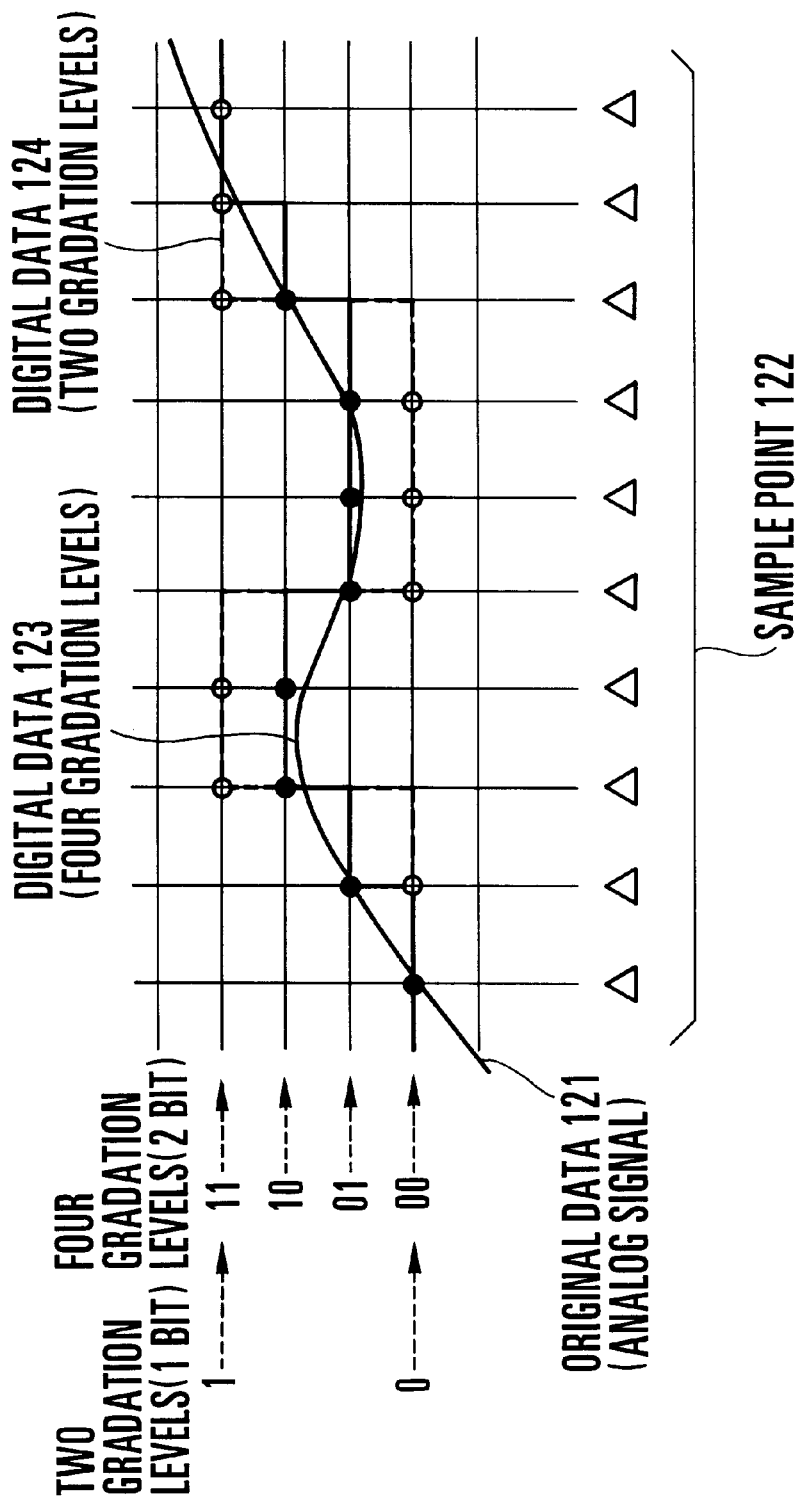
F I G. 12

ELECTRONIC IMAGE SENSING APPARATUS

BACKGROUND OF THE INVENTION

The present invention relates to an electronic image sensing apparatus and, more particularly, to an electronic image sensing apparatus for sensing an optical image with an electronic image sensing element and processing the optical image as an electrical signal.

In general, in electronic image sensing apparatuses for receiving, as a still image, image sensing data serving as light intensity information from an object in photography, a very wide light intensity distribution from the object is detected by an image sensing element having a finite sensitivity width such as a silver halide film or CCD image sensing element. It is essentially important to determine an optimal exposure amount.

Of these apparatuses, a traditional image sensing system (optical camera) using a silver halide film has two opportunities of adjusting the luminance/image quality from the photography to final image printing on print paper in order to obtain the image sensing data as a "photograph with optimal brightness".

The first luminance/image quality adjustment is made when a photographer releases the shutter of the optical camera.

In this case, the photographer decides the shutter speed and F-number in accordance with his experiences, calculations based on the light amount measured by an exposure meter, or an automatic exposure control mechanism (AE mechanism) if incorporated in the optical camera. The shutter speed and F-number, which are supposed to be optimal, are determined to adjust the light amount.

The second luminance/image quality adjustment is made when an image is printed on print paper in a film development/printing shop (DPE shop).

It is checked whether the exposure in photography is overexposure or underexposure. If so, an exposure amount in printing is adjusted, and the brightness of the image data finally printed on the print paper is adjusted to be optimal.

FIGS. 9A and 9B explain a luminance correction process in printing an image on print paper.

In general, the luminance characteristic of print paper is almost linear at the central portion having an optimal luminance value in an original image recorded on a film.

The luminance characteristic of the print paper is curved at the two ends, low- and high-luminance regions of the image. The contrast difference cannot be clearly expressed in these regions.

In printing an image on print paper having the above characteristic, a printer automatically adjusts the luminance and determines an optimal luminance of an original image whose luminance distribution is optimal.

An overexposed image 91B and an underexposed image 91A have shifted peaks in the luminance distribution, as shown in FIG. 9A.

An image having a high luminance on a negative film is called an overexposed image on print paper, and an image having a low luminance on a negative film is called an underexposed image on print paper.

An operator in a DPE shop arranges an image in the optimal range of print paper, i.e., the optimal luminance range of print paper and obtains a photograph with optimal brightness in accordance with his experiences.

For example, the underexposed image 91A is adjusted toward a higher luminance so as to fall its luminance distribution within the optimal luminance range of the print paper. The underexposed image 91A is expressed as an image 92A (FIG. 9B) on the print paper.

Similarly, the overexposed image 91B is adjusted toward a lower luminance and is expressed as an image 92B (FIG. 9B) on the print paper.

In an electronic image sensing apparatus such as a conventional electronic camera apparatus for causing an image sensing element such as a CCD to photoelectrically convert a photographed image, process the resultant analog image sensing data, and output the image as image data, luminance adjustment of the image sensing data is made once as exposure control when the photographer releases the shutter.

FIG. 10 shows the processing operation from photography to data output in a conventional electronic image sensing apparatus, and FIG. 11 shows the arrangement of the conventional electronic image sensing apparatus.

In the conventional electronic image sensing apparatus, the photographer sets the shutter speed and F-number manually or using an automatic exposure control mechanism (AE mechanism) as in the optical camera using the silver halide film (step 100) and senses an image (step 101).

In response to the shutter release, an object image is detected by an image sensing unit 14 via a lens 11, a stop 12, and a shutter 13. The luminance of light from the object is temporarily stored as analog (voltage value) image sensing data in units of pixels.

The image sensing data is immediately read out and converted into a digital value of about 8 bits by a high-speed A/D converter 17 (step 102).

A digital signal processor 18 performs various types of digital signal processing. The processed data is stored in an image recording digital memory 19 as digital image data having, e.g., an 8-bit width.

The digital value having the 8-bit width is externally output from the digital signal processor 18, as needed.

In this conventional electronic image sensing apparatus, however, the image sensing data from the image sensing element is converted into normally an 8-bit digital value in the A/D conversion process (step 102).

When the luminance of the image data is to be adjusted later, the luminance resolution of the image further lowers. A fine change in luminance of the original image cannot be expressed even in a luminance resolution correction process. As a result, the image quality degrades.

In general, digital image data expressed by two-dimensional sample points have two important parameters, i.e., spatial resolution and luminance resolution.

A sample point constituting a digital image in the two-dimensional space is called a pixel. A value which expresses the smallest scale of a distance between two adjacent pixels is called the spatial resolution.

A value which expresses the smallest scale of the luminance value of each pixel is called luminance resolution. When any one of these values is unsatisfactory, the resultant image cannot be called a good image.

FIG. 12 shows an example in which a fine change in the luminance direction is lost.

Referring to FIG. 12, a dotted line 4 indicates the 1-bit digitalization result; a solid line 123, the 2-bit digitalization result.

When each sample point 122 of an analog image signal (original data) whose luminance finely changes is digitized in the 1-bit unit (two gradation levels) and 2-bit unit (four gradation levels), the fine change in luminance is lost with a decrease in bit width (digital resolution).

Once original data 121 from the image sensing unit is digitized at a small bit width, the luminance resolution greatly degrades. Any subsequent process cannot restore the lost luminance resolution, as can be apparent from FIG. 12.

SUMMARY OF THE INVENTION

The present invention has been made to solve the conventional problem described above, and has as its object to provide an electronic image sensing apparatus capable of obtaining image data having a desired luminance distribution without greatly degrading the luminance resolution.

In order to achieve the above object of the present invention, there is provided an electronic image sensing apparatus for photoeletrically converting an optical image in an image sensing unit, processing the resultant analog image sensing data, and recording, displaying, outputting, or externally outputting the processed image sensing data, comprising an analog semiconductor memory for temporarily storing the image sensing data from the image sensing unit in the form of an analog value, a processor for generating adjustment information for adjusting a luminance distribution of the entire image sensing data on the basis of luminance information of the image sensing data read out from the analog semiconductor memory, and a luminance distribution adjustment unit for adjusting the luminance distribution of the entire image sensing data from the analog semiconductor memory on the basis of the adjustment information generated by the processor.

BRIEF DESCRIPTION OF THE DRAWINGS

FIG. 2 is a block diagram showing an electronic image sensing apparatus according to the first embodiment of the present invention;

FIGS. 5A and 5B are block diagrams showing an electronic image sensing apparatus according to the second embodiment of the present invention;

FIGS. 6A to 6D are graphs for explaining A/D conversion characteristics used in an luminance distribution adjustment unit shown in FIG. 5;

FIG. 12 is a view for explaining an example in which a fine change in luminance is lost in the luminance direction.

DESCRIPTION OF THE PREFERRED EMBODIMENTS

The present invention will now be described with reference to the accompanying drawings.

Figure 1:
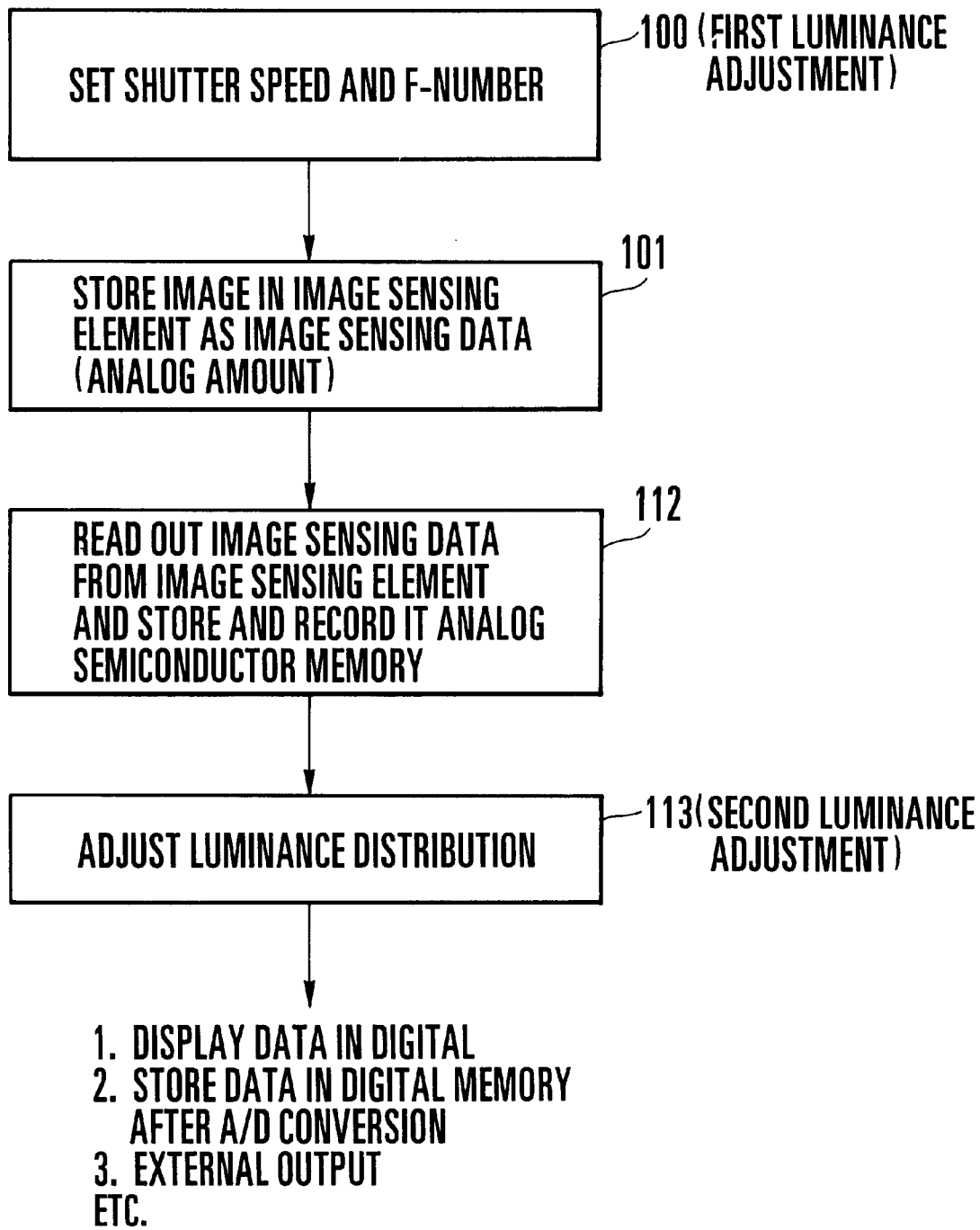
FIG. 1 is a flow chart showing the processing operation of an electronic image sensing apparatus according to the present invention.

FIG. 1 shows the processing operation of an electronic image sensing apparatus according to the present invention.

The F-number and shutter speed are set to predetermined values by automatic exposure control as in a conventional electronic image sensing apparatus or optical camera (step 100).

Light from an object passes through the stop and shutter, is photoelectrically converted into an electrical signal by an image sensing unit, and is stored as analog image sensing data (step 101).

According to the present invention, the image sensing data is immediately read out and stored in an analog semiconductor memory as an analog value (step 112).

The image sensing data is read out from the analog semiconductor memory. Adjustment information for luminance distribution adjustment is generated on the basis of the luminance information of the readout data. A luminance distribution adjustment unit adjusts a luminance distribution on the basis of this adjustment information (step 113).

The image sensing data whose luminance distribution is adjusted is directly output to an image display unit, externally output in the form of an analog value, or stored in another nonvolatile analog semiconductor memory.

Alternatively, the image sensing data is A/D-converted, and the digital data is stored in a digital memory, or externally output.

In this case, the analog semiconductor memory may be a nonvolatile analog semiconductor memory. Any analog semiconductor memory may be used if the image sensing data from the image sensing unit is stored and held for a period of time enough to perform the luminance distribution adjustment process.

As described above, according to the present invention, the image sensing data obtained from the image sensing unit is temporarily stored in the analog semiconductor memory in the form of an analog value. The luminance distribution of all the image sensing data is appropriately adjusted on the basis of the luminance information of the stored image sensing data. As compared with the conventional case in which analog data is digitized at a relatively small bit width and then subjected to luminance distribution adjustment, image data having a desired luminance distribution can be obtained without greatly degrading the luminance resolution.

The first embodiment of the present invention will be described with reference to FIG. 2.

FIG. 2 shows an electronic image sensing apparatus of a multiple exposure adjustment type according to the first embodiment of the present invention. The same reference numerals as in the prior art (FIG. 11) denote the same parts in the first embodiment.

In the first embodiment, as compared with the conventional electronic image sensing apparatus (FIG. 11), an analog semiconductor memory 21 for directly storing, as an analog value, image sensing data from an image sensing unit 14, and a luminance distribution adjustment unit 22 for adjusting the luminance distribution of the analog image sensing data read out from the analog semiconductor memory 21 are connected to the output of the image sensing unit 14.

An A/D converter 23 for converting the analog image sensing data whose luminance distribution is adjusted into a digital value is connected to the output of the luminance distribution adjustment unit 22.

Since the analog image sensing data can be read out at a relatively low speed, the luminance distribution adjustment unit (gamma conversion circuit) 22 and the A/D converter 23 can be arranged using low-speed, inexpensive elements.

An image display unit 24 for displaying and outputting the image sensing data whose luminance distribution is adjusted is connected to the output of the luminance distribution adjustment unit 22.

An operation input unit 25 for allowing the user to designate an area for calculating a parameter used in luminance distribution adjustment, i.e., a luminance reference area of all the images displayed and output on the image display unit 24 is connected to a digital signal processor 18.

The operation of the first embodiment will be described with reference to FIG. 2.

In photography, an object image is detected by the image sensing unit 14 via a lens 11, a stop 12, and a shutter 13.

A large number of photoelectric conversion elements arranged as pixels on the two-dimensional plane in the image sensing unit 14 detect the image luminance in units of pixel positions.

In this case, the luminance intensity is converted into the magnitude of an analog voltage value.

The analog voltage values of the respective pixels are continuously arranged on the time axis in a predetermined order to generate analog image sensing data. The analog image sensing data are output in synchronism with a predetermined clock signal.

The image sensing data obtained by the image sensing unit 14 as described above is input to an analog semiconductor memory and temporarily stored in the form of an analog value.

An automatic exposure control circuit 16 automatically adjusts the F-number and shutter speed in accordance with the intensity of external light detected by a photosensor 15.

The present invention exemplifies a mechanism in which the shutter 13 is disposed in front of the image sensing unit 14. However, this shutter is not limited to a mechanical shutter and corresponds to a photoelectric conversion element in the image sensing unit 14, i.e., a functional block for managing time for which object light is being received.

For this reason, the shutter 13 includes a so-called electronic shutter.

The analog image sensing data detected by the image sensing unit 14 is immediately read out and written in the analog semiconductor memory 21.

The image sensing data are sequentially read out from the analog semiconductor memory 21 and output to the image display unit 24 via the luminance distribution adjustment unit 22.

In this case, the image sensing data are read out for the first time, and no luminance distribution adjustment is performed in the luminance distribution adjustment unit 22. The image sensing data are directly output from the luminance distribution adjustment unit 22.

The image sensing data from the luminance distribution adjustment unit 22 is digitized by the A/D converter 23 and input to the digital signal processor 18.

Of all the image sensing data input from the A/D converter 23, the data corresponding to a predetermined luminance reference area designated by the operation input unit 25 is used to generate adjustment information for luminance correction, thereby designating luminance correction to the luminance distribution adjustment unit 22.

The analog semiconductor memory 21 reads out the same image sensing data again, which is then input to the luminance distribution adjustment unit 22.

The luminance distribution is adjusted on the basis of a newly designated adjustment value. As described above, the output from the luminance distribution adjustment unit 22 is output to the image display unit 24 as analog data.

The image sensing data is digitized by the A/D converter 23 and compressed by the digital signal processor 18, as needed. The digital data is externally output.

As compared with the conventional case in which analog data is digitized at a relatively small bit width and then subjected to luminance distribution adjustment, since the luminance distribution of the analog value itself is adjusted, the luminance resolution rarely degrades. The luminance distribution can be adjusted without any complex processing while maintaining the original image quality.

The image sensing data is stored in the analog semiconductor memory 21 and repeatedly read out in luminance distribution adjustment. The luminance distribution can be repeated adjusted without photographing an image again.

The luminance adjustment information need not be generated for each photography. If image sensing data require almost identical luminance distributions, for example, if almost no change in photographic frame is made, the luminance distribution may be adjusted on the basis of the adjustment information generated in the previous photography.

The digital signal processor 18 may determine this on the basis of comparison between the luminance distributions, or the user may decide this in accordance with a predetermined operation.

The arrangement of the luminance distribution adjustment unit will be described with reference to FIG. 3.

Figure 3:
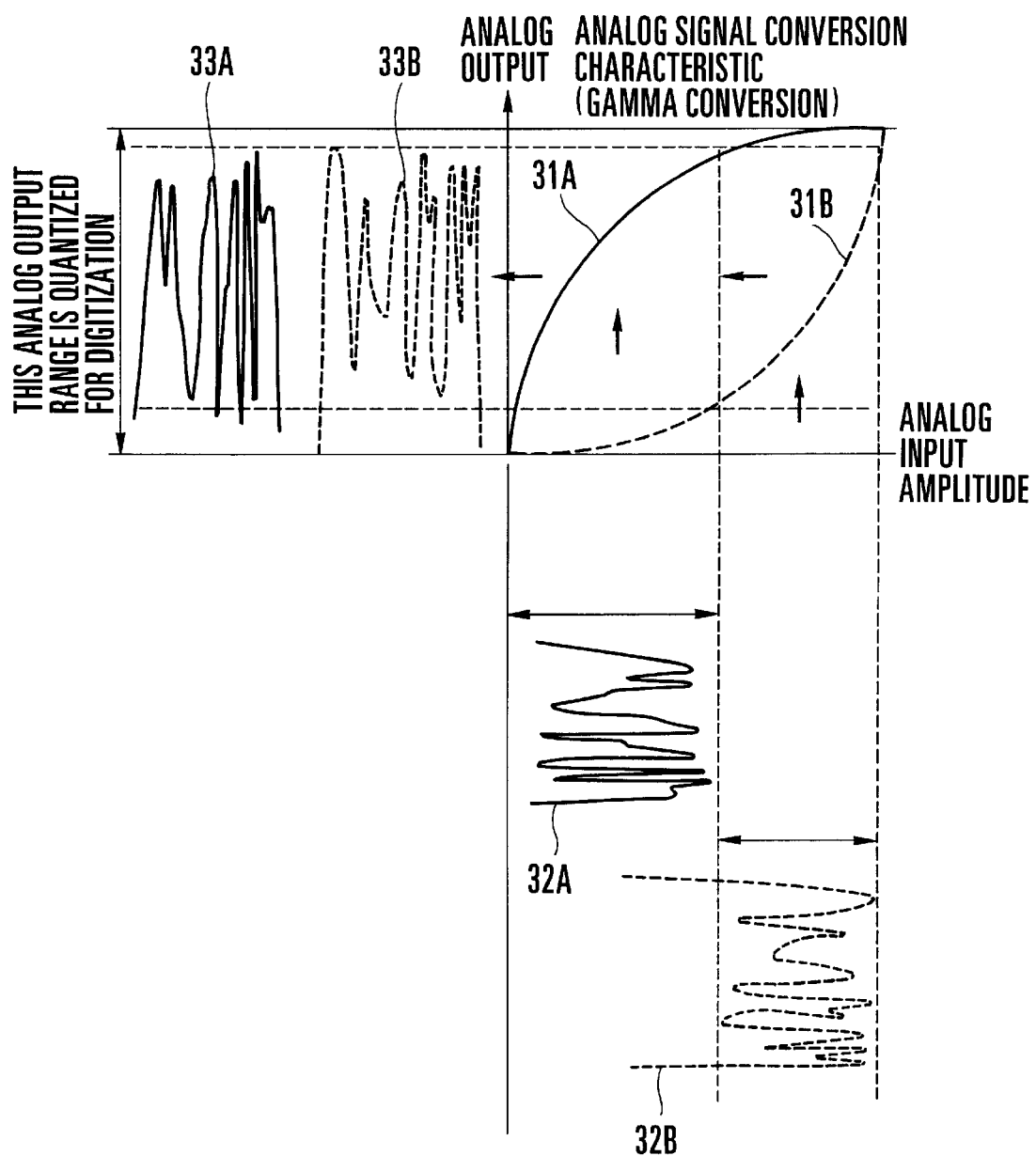
FIG. 3 is a view for explaining an analog signal conversion characteristic used in luminance distribution adjustment.

A gamma correction circuit having analog signal conversion characteristics shown in, e.g., FIG. 3 can realize the luminance distribution adjustment unit 22.

FIG. 3 shows the analog signal conversion characteristics (gamma characteristics) used in luminance distribution adjustment. The abscissa represents the amplitude of an input analog signal, and the ordinate represents the amplitude of an output analog signal.

For example, when an analog signal 32A having a luminance distribution shifted to a lower luminance (smaller amplitude) is input, that is, when a dark image is input, a characteristic 31A is used as the analog level conversion characteristic.

This characteristic can be realized by an operational amplifier, which has a certain gain in a low input voltage region and saturates at an arbitrarily set point by an amplitude limit.

This conversion characteristic is selected in accordance with designation based on the adjustment information from the digital signal processor 18.

When an analog signal 32B having a luminance distribution shifted to a higher luminance (larger amplitude) is input, that is, when a bright image is input, a characteristic 31B is used.

This characteristic is realized to have a certain gain from a point exceeding an arbitrary positive bias value.

As described above, when either signal is input, an analog output having an optimal amplitude with respect to the input range of the subsequent A/D converter can be obtained.

When the two gain characteristics described above are combined, a window process for extracting a specific luminance (input amplitude) range can be performed.

The luminance distribution can be freely adjusted using a circuit having a characteristic except the gamma correction.

The image sensing data after luminance distribution adjustment may be output to an external device directly or the internal display device, or may be written in a storage memory in the camera upon digitization.

The image sensing data can be digitized into a digital value having a desired bit width because the input range of the A/D converter can be efficiently used. Any A/D converter, which can satisfy the necessary amount, can be used, and no high-precision A/D converter need be used.

The luminance distribution adjustment process will be described with reference to FIG. 4.

Figure 4:
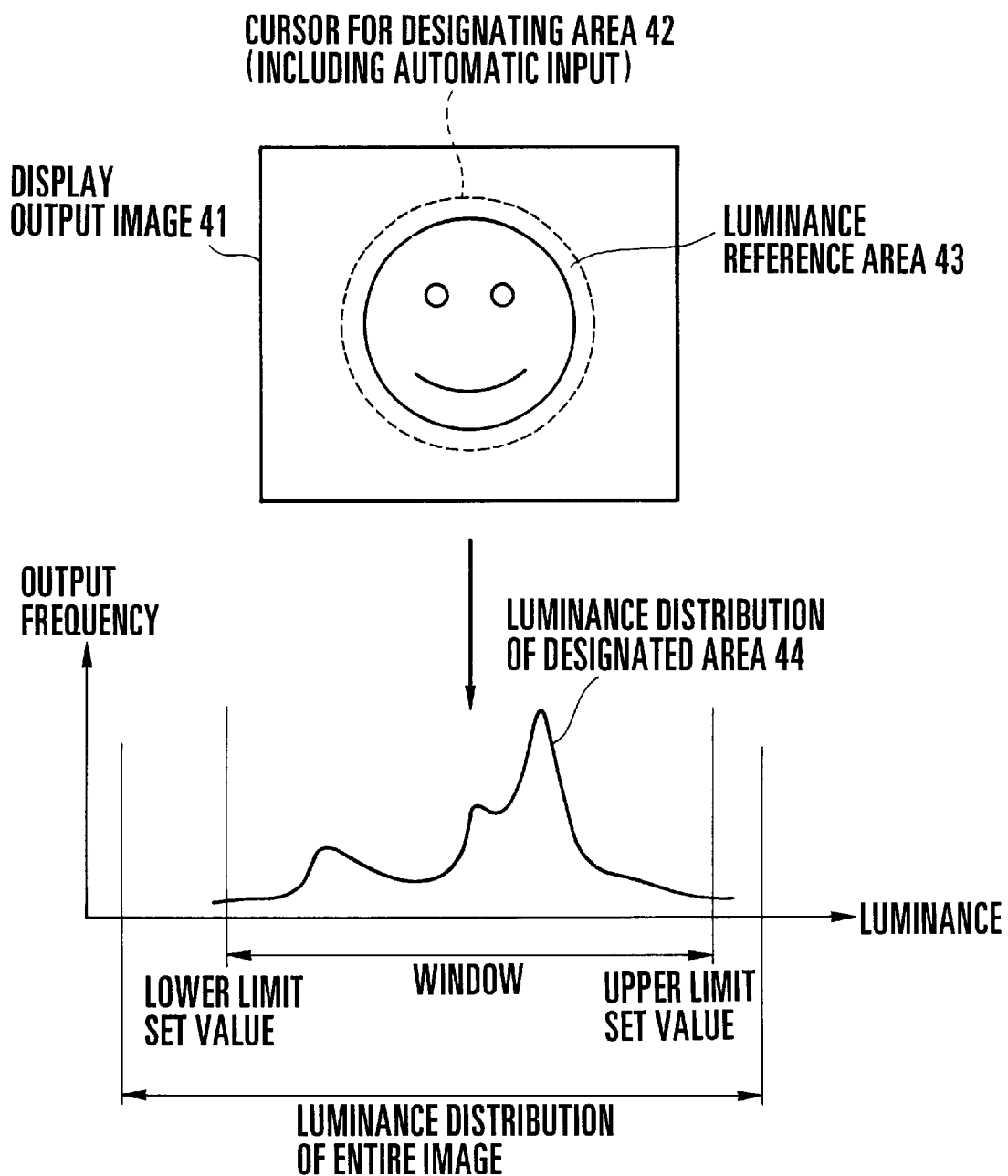
FIG. 4 is a view for explaining a luminance distribution adjustment process.

FIG. 4 shows the luminance distribution adjustment process.

To determine a luminance value as a reference in adjusting an image luminance, the operation input unit 25 designates an area on the image sensing data which serves as a correction process target, i.e., a luminance reference area 43.

In this case, the user operates the operation input unit 25 to move a cursor 42 for designating an area while watching a display output image 41 displayed on the image display unit 24. The user then designates the luminance reference area 43.

In response to this designation, the digital signal processor 18 calculates a luminance distribution 44 in the area designated by the operation input unit 25.

A reference parameter such as an average luminance value, median value, or maximum distribution value is obtained on the basis of the luminance distribution 44. The adjustment information representing the luminance distribution conversion characteristic for optimizing the luminance distribution of the image data corrected using the parameter is determined to control the luminance distribution adjustment unit 22.

The luminance of the image displayed in the luminance reference area 43 is adjusted to a desired luminance.

In adjusting the luminance distribution, the luminance distribution adjustment unit 22 may be controlled as follows. Predetermined maximum and minimum luminance values are set for the luminance distribution of the image sensing data before luminance correction, and the luminance values falling between the maximum and minimum luminance values are extracted while widening the output range to a desired luminance output range.

This allows adjustment of the luminance gradation (contrast) width of the image sensing data.

As a luminance distribution adjustment method, a luminance distribution may be translated (shifted) in place of the above method in which the luminance distribution range is widened.

Alternatively, a predetermined luminance range may be weighted, and the weighted range may be widened, narrowed, or translated.

In addition, the calculated reference parameter such as an average luminance value is defined as the center, and positions spaced apart from the center by predetermined distances may be automatically set as maximum and minimum luminance values.

Still another alternative is a switch mechanism for decreasing or increasing the difference (e.g., a window width) between the maximum and minimum luminance values.

This allows the user to manually adjust the contrast.

The cursor 42 representing the luminance reference area 43 designated by the operation input unit 25 may be superposed on the display output image 41 on the image display unit 24. The position and size of the cursor 42 may be changed in accordance with the operation of the operation input unit 25.

This allows the user to input the luminance reference area 43 without fail.

The shape of the cursor 42 may be a square, circle, ellipse, or polygon. A switch for changing the shape of the cursor 42 may be arranged.

The user can appropriately designate a luminance reference area having an arbitrary shape.

The luminance reference area 43 may be automatically determined by the digital signal processor 18.

The position and size of the face of a person photographed may be automatically detected in accordance with the hue range of the skin color of the person or the shape of a contour obtained upon differentiating the image sensing data. The detected area may be defined as the luminance reference area 43.

When a photographic object having a high saturation and large area can be detected near the center of the image data, this area may be defined as the luminance reference area 43.

The position and shape of a photometry portion used in the predictive AE mechanism can be used as the luminance reference area 43.

The photometry area used in the predictive AE mechanism is an area of interest particularly when the photographer decides the exposure. The calculation of the average value in this area is equivalent to an actual measurement and correction of the measurement value.

The second embodiment of the present invention will be described with reference to FIGS. 5A and 5B.

FIGS. 5A and 5B show an electronic image sensing apparatus according to the second embodiment of the present invention. The same reference numerals as in FIG. 2 denote the same parts in FIGS. 5A and 5B.

FIG. 5A shows the overall arrangement of the electronic image sensing apparatus, and FIG. 5B shows a luminance distribution adjustment unit using an A/D converter.

In the first embodiment (see FIG. 2), the luminance distribution adjustment unit 22 adjusts the luminance distribution, and then A/D converter 23 digitizes the output from the unit 22. According to the second embodiment, as shown in FIG. 5A, a luminance distribution adjustment unit 26 using an A/D converter is used in place of the luminance distribution adjustment unit 22 and simultaneously performs a luminance distribution adjustment process and an A/D conversion process.

In general, an A/D converter has two externally input reference voltages as the upper and lower limits of an input voltage. A/D conversion is performed while the range between the upper and lower limits is made to correspond to the maximum amplitude of the output digital value.

For example, for an 8-bit output (0 to 255), when an input voltage Vi is equal to or lower than a lower limit reference voltage Vref−, an output is "0"; when it is equal to or higher than a higher limit reference voltage Vref+, an output is "255". The input voltages Vi in the range of Vref− to Vref+ are digitized in 256 levels (0 to 255).

The maximum amplitude of an analog value of image sensing data is divided into a plurality of input voltage ranges, and a predetermined reference voltage is applied for each input voltage range. Therefore, different analog signal conversion characteristics are obtained for the input voltage ranges, respectively.

An appropriate analog signal conversion characteristic corresponding to a degree of shift of the luminance distribution can be used to adjust the image sensing data to have an optimal luminance distribution.

As shown in FIG. 5B, in this case, the luminance distribution adjustment unit 26 have three parallel A/D converters 51A to 51C corresponding to input voltage ranges VA to VC with respect to image sensing data Vi read out from an analog semiconductor memory 21.

An A/D converter having a digital output width of 8 bits is used in the following description.

When the input voltage ranges VA to VC are set to $0 \leq Vi \leq V1$, $V1 \leq Vi \leq V2$, and $V2 \leq Vi \leq Vm$, respectively, the upper and lower limit values of the input range voltages are used as the upper and lower limit reference voltages Vref+ and Vref− of the A/D converters 51A to 51C.

The A/D conversion characteristics of the A/D converters 51A to 51C are shown in FIGS. 6A to 6C, respectively.

Multipliers 52A to 52C for multiplying digital outputs DA to DC from the A/D converters 51A to 51C are connected to the outputs of the A/D converters 51A to 51C, respectively.

An adder 53 for outputting the sum of the outputs from the multipliers 52A to 52C is connected to the outputs of the multipliers 52A to 52C. The adder 53 outputs, as a digital value DOUT, the image sensing data whose luminance distribution is adjusted.

When the magnifications of the multipliers 52A to 52C are defined as PA to PC, respectively, the output DOUT from the adder 53 is given as follows:

$$DOUT = DA \times PA + DB \times PB + DC \times PC$$

for PA+PB+PC=1

The magnifications PA to PC are set to match the input voltage ranges VA to VC, respectively.

For example, assume that the input voltage Vi in the input voltage range VA (0 to V1) is converted into DOUT of "0" to "31". Since DOUT has an 8-bit width (0 to 255), "0" to "31" corresponds to ⅛ the whole DOUT.

An output side DA of the A/D conversion characteristic in FIG. 6A is multiplied ⅛ (=PA) to obtain the A/D conversion characteristic in the input voltage range VA in FIG. 6D.

In converting the input voltage Vi in the input voltage range VB (V1 to V2) into DOUT of "31" to "233", "31" to "233" corresponds to ⅝ the whole DOUT.

The A/D conversion characteristic in FIG. 6B is multiplied ⅝ (=PB).

In this case, since DA×PA becomes "31" in the input voltage range VB, this value is added to DB×PB to obtain the A/D conversion characteristic in the input voltage range VB in FIG. 6D.

Similarly, the A/D conversion characteristic is obtained even in the input voltage range VC. As a result, a desired A/D conversion characteristic shown in FIG. 6D, i.e., the analog signal conversion characteristic used in luminance distribution adjustment can be obtained.

When the three A/D converters 51A to 51C are arranged parallel to each other, the luminance distribution can be instantaneously adjusted even with image sensing data input corresponding to any one of the input voltage ranges VA to VC. At the same time, the A/D conversion process can be performed.

The processing time required for the luminance distribution adjustment process can be shortened.

In the above description, the output DOUT is calculated by the outputs DA to DC from the A/D converters 51A to 51C using the multipliers 52A to 52C and the adder 53. The multiplications and addition can be performed by a digital signal processor 18, thereby omitting the circuit arrangement corresponding to the multipliers and adder.

A desired A/D conversion characteristic may be realized by arranging A/D converters corresponding to a larger number of input voltage ranges.

In the above description, the three A/D converters 51A to 51C are used. However, one A/D converter may be repeatedly used to perform the A/D conversion process in the input voltage ranges VA to VC.

For example, a reference voltage corresponding to the input voltage range VA is set in an A/D converter, and image sensing data is input to this A/D converter to obtain the output DA.

Similarly, reference voltages corresponding to the input voltage ranges VB and VC are set in the A/D converter, and image sensing data are input to obtain the outputs DB and DC.

The outputs DA to DC thus obtained are added to obtain DOUT.

As described above, only one A/D converter can be used to simplify the circuit arrangement.

The reference voltage input to the A/D converter may be switched and controlled in real time in accordance with the value of the input voltage Vi.

Figure 7A:
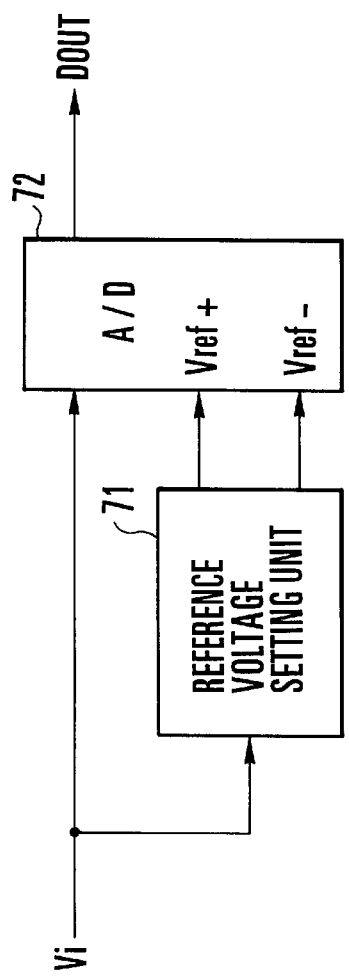
FIGS. 7A and 7B are a block diagram and a graph, respectively, showing another arrangement of the luminance distribution adjustment unit using an A/D converter.
Figure 7B:
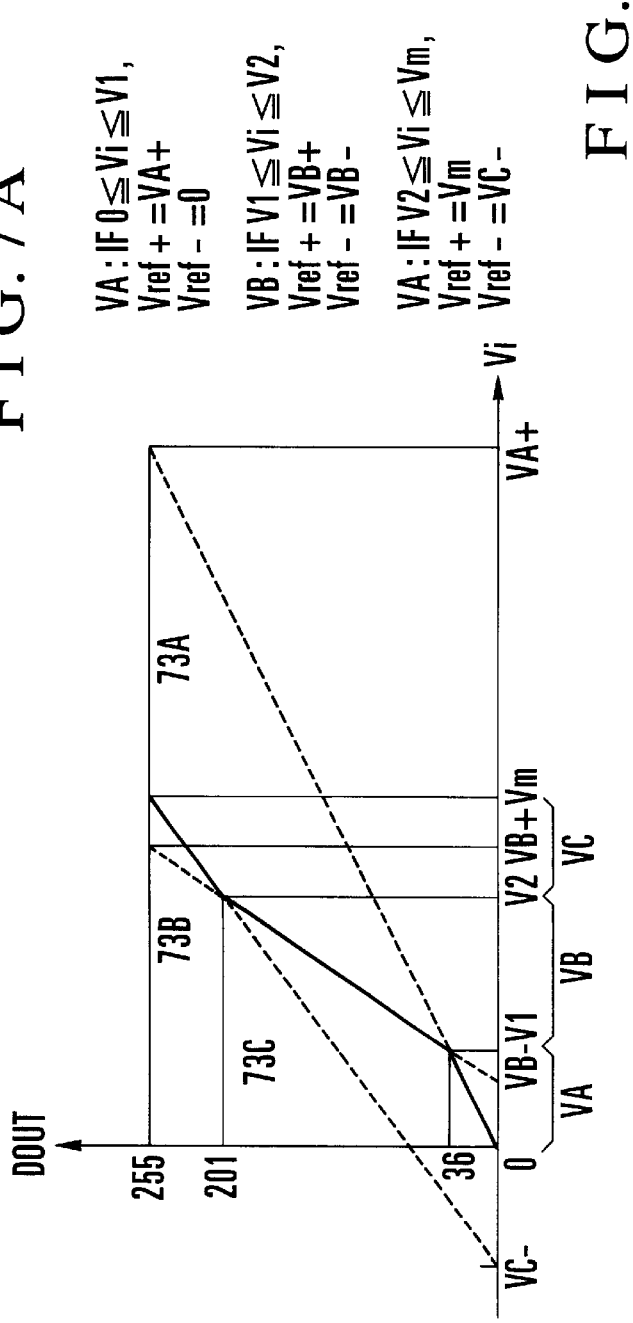

FIG. 7A shows the luminance distribution adjustment unit using the A/D converter, and FIG. 7B shows an A/D conversion characteristic.

Referring to FIG. 7A, a reference voltage setting unit 71 for switching and controlling the reference voltages Vref+ and Vref− of an A/D converter 72 on the basis of an input voltage Vi is arranged.

A means for detecting the correspondence between the input voltage Vi and a specific input voltage range can be realized by arranging a plurality of parallel comparators having a predetermined voltage range as a detection range.

The reference voltage setting unit 71 selects and outputs a corresponding reference voltage from a plurality of reference voltages on the basis of these comparison results.

As shown in FIG. 7B, when the input voltage Vi falls within the input voltage range VA, the lower and upper limit reference voltages Vref− and Vref+ are given as 0 and VA+, respectively.

A characteristic 73A for converting an input voltage (0 to V1) into DOUT ("0" to "36") and outputting DOUT is obtained.

In this case, since the input voltage Vi changes within only the range of 0 to V1, the A/D conversion characteristic in the input voltage range VA is obtained.

Similarly, when the input voltage Vi falls within the input voltage range VA, the lower and upper limit reference voltages Vref− and Vref+ are given as VB− and VB+, respectively.

A characteristic 73B for converting the input voltage (V1 to V2) into DOUT ("36" to "201") and outputting DOUT is obtained.

When the input voltage Vi falls within the input voltage range VA, the lower and upper limit reference voltages Vref− and Vref+ are given as VC− and Vm, respectively.

A characteristic 73C for converting the input voltage (V2 to Vm) into DOUT ("201" to "255") and outputting DOUT is obtained.

The A/D conversion characteristics in all the input voltage ranges VA to VC are obtained. As a result, a desired A/D conversion characteristic shown in FIG. 7B, i.e., the analog signal conversion characteristic used for luminance distribution adjustment is obtained.

The reference voltage of the A/D converter is switched and controlled in accordance with the voltage value of the input image sensing data. Even if only one A/D converter is used, the image sending data need not be repeatedly read out or converted. The luminance distribution adjustment process and the A/D conversion process can be executed with a simple circuit arrangement at a high speed.

The third embodiment of the present invention will be described with reference to FIG. 8.

Figure 8:
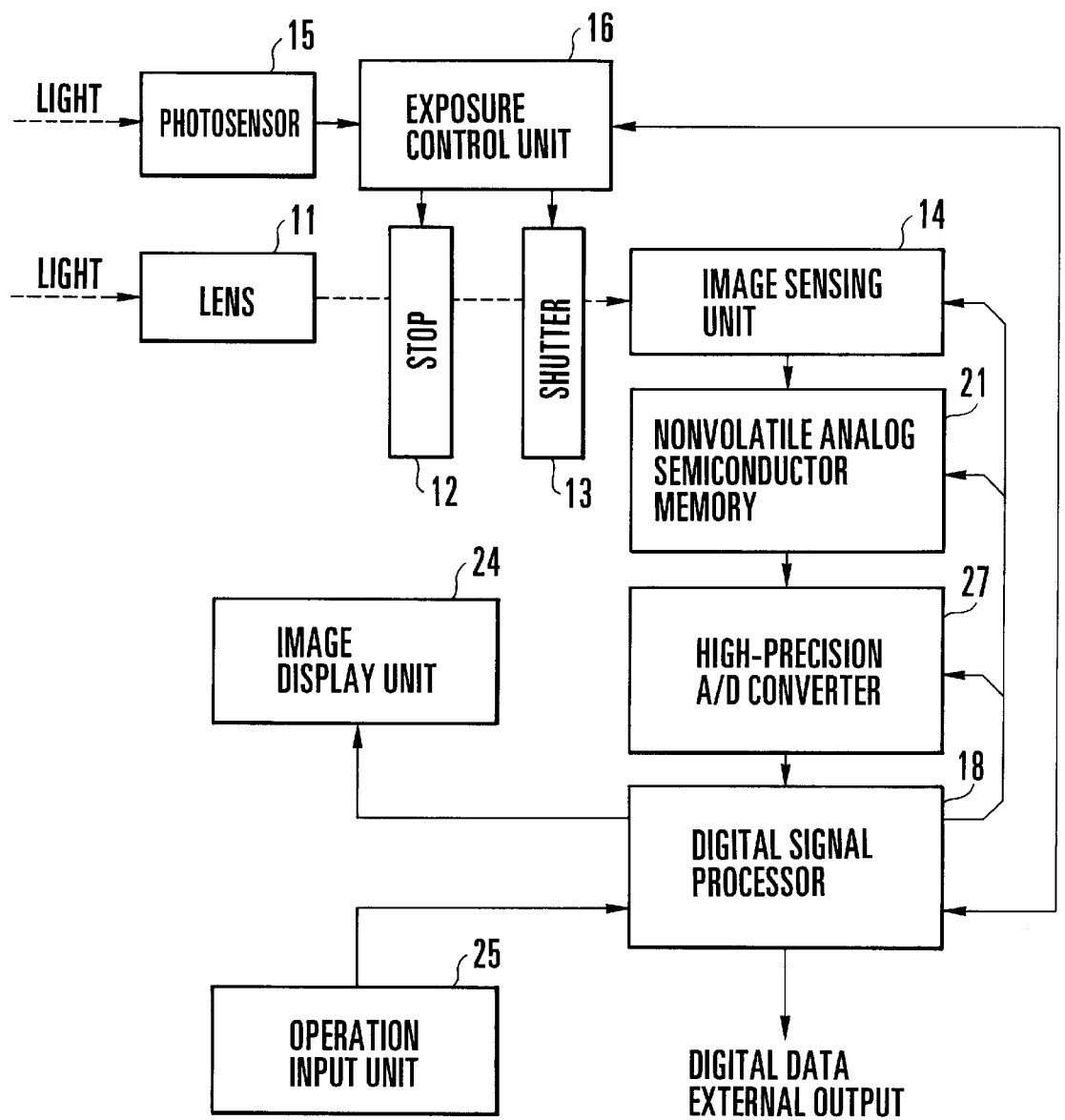
FIG. 8 is a block diagram showing an electronic image sensing apparatus according to the third embodiment of the present invention.
Figures 9A, 9B:
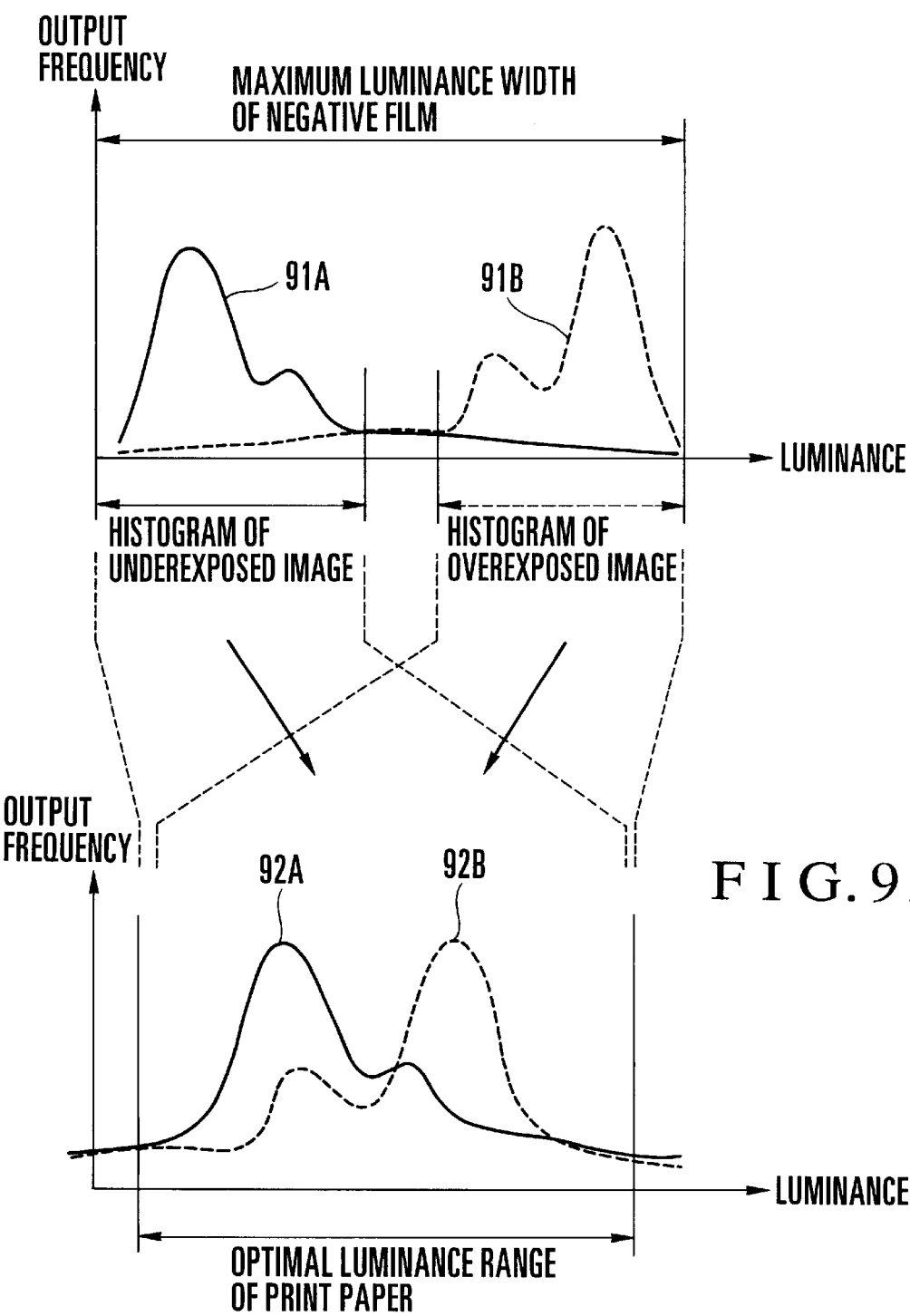
FIGS. 9A and 9B are graphs for explaining a luminance correction process in printing an image on print paper.
Figure 10:
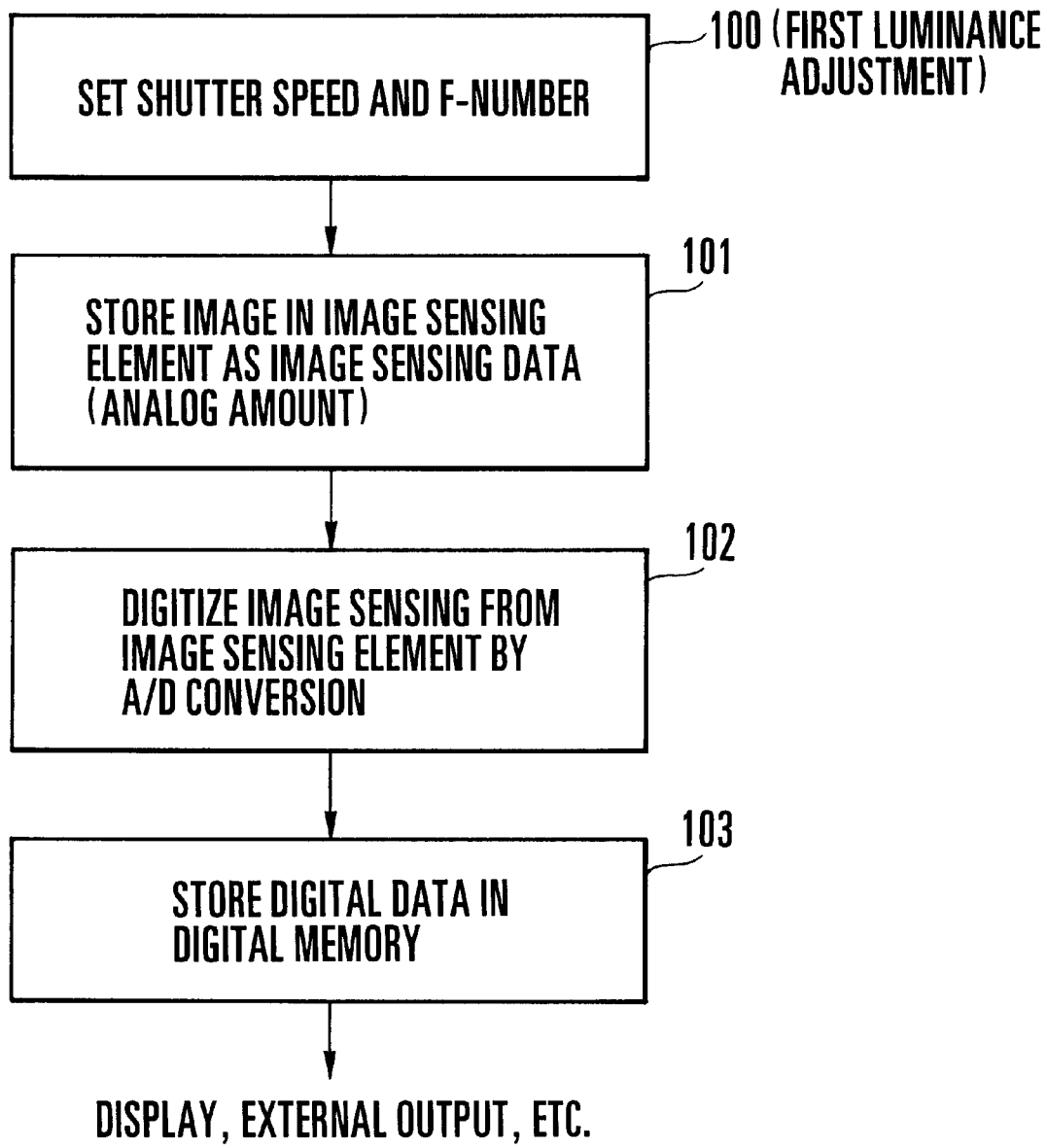
FIG. 10 is a flow chart showing the processing operation from photography to data output in a conventional electronic image sensing apparatus.

FIG. 8 shows an electronic image sensing apparatus according to the third embodiment of the present invention. The same reference numerals as in FIG. 2 denote the same parts in FIG. 8.

In the first embodiment (see FIG. 2), the luminance distribution of analog data is adjusted. In the third embodiment, a high-precision A/D converter 27 is connected to the output of an analog semiconductor memory 21. Image sensing data is converted into a digital data, and then a digital signal processor 18 adjusts the luminance distribution of the digital value.

As previously described, in the conventional electronic image sensing apparatus, since image sensing data is digitized and output using an A/D converter of, normally about 8 bits, the luminance resolution of the image further degrades in adjusting the luminance of this image data.

Even if the luminance resolution is corrected, a fine change in luminance of the original image cannot be expressed, resulting in degradation of image quality.

In order to solve the problem of a shortage of the luminance resolution, the resolution of the A/D converter 17 must increase to, e.g., 16 bits.

When the problem is solved by increasing the luminance resolution of the digital data, product design suffers several new problems.

More specifically, a high-precision, high-speed A/D converter is required. The data memory capacity upon A/D conversion inevitably increases, and high-speed, high-performance operation elements (digital signal processor) such as a DSP required for digital image processing such as compression are required.

The manufacturing cost of the entire image sensing system increases, and power consumption increases due to the increase in mounted memory capacity, a high-speed A/D converter, and operation elements.

Figure 11:
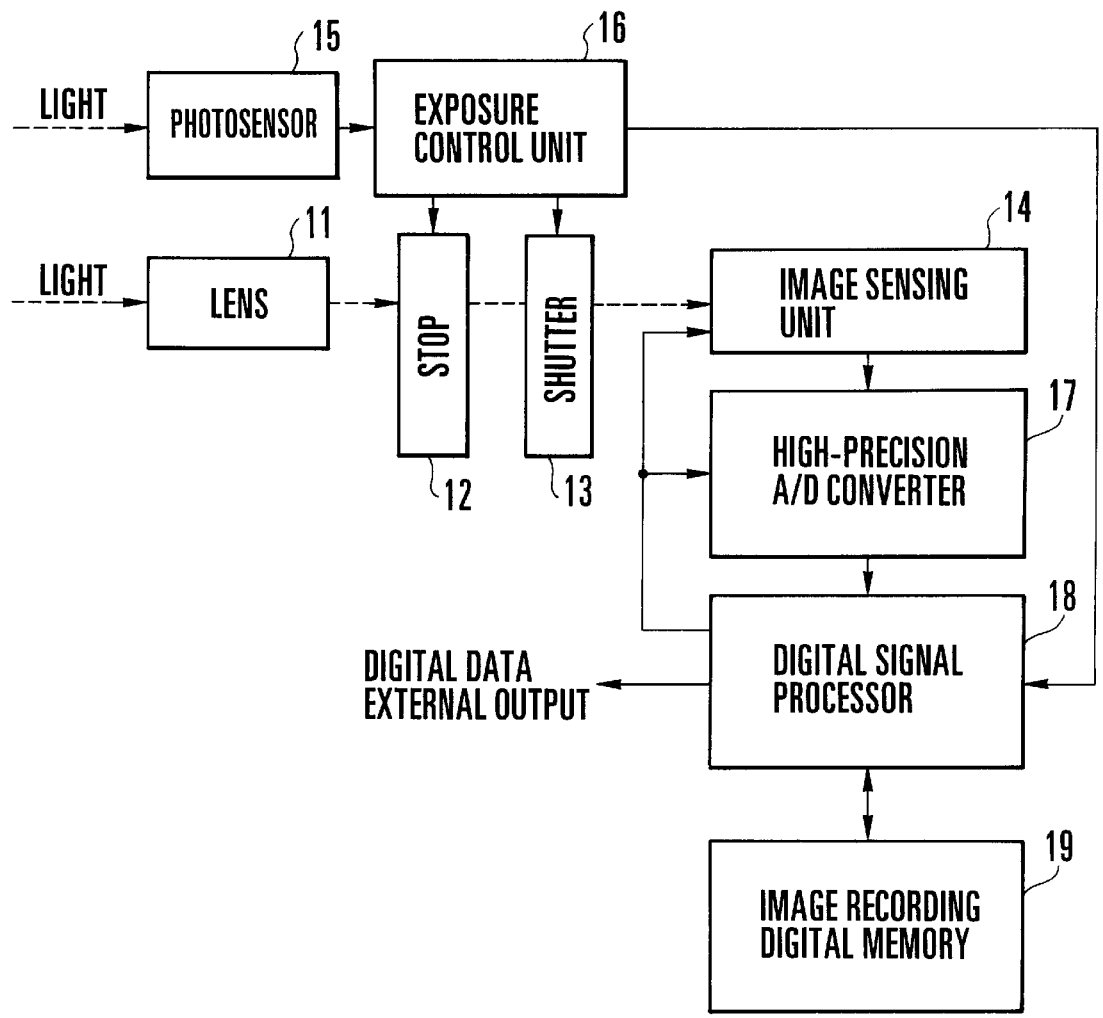
FIG. 11 is a block diagram showing a conventional electronic image sensing apparatus.

Assume that image data obtained by the conventional electronic image sensing apparatus shown in FIG. 11 is received by an apparatus (e.g., a personal computer) capable of performing data processing and is processed, and that the processed data is output to print paper, a color printer, or a CRT monitor. This processing allows the second brightness adjustment as in a silver halide system using an optical camera.

In this case, however, once the data is quantized into data having a low luminance resolution, the precision of the luminance resolution of the original image data, measured by the image sensing element, is lost.

In this embodiment, as described above, the analog image sensing data is stored in the analog semiconductor memory 21, and a read and A/D conversion need not be performed at high speed.

Although a high-precision A/D converter having a large gradation width, such as the one having a 16-bit width higher in precision than the 8-bit width is used, a low-speed A/D converter can be used. In this case, power consumption can be reduced.

In this case, the output bit width of the high-precision A/D converter 27 can be selected using as criteria the luminance region width of the desired image sensing data and the output luminance region width of the luminance distribution of the input image sensing data, depending on the conversion characteristic for luminance distribution adjustment.

For example, when the output luminance region width is twice the luminance region width of the desired image sensing data, the high-precision A/D converter 27 having a 16-bit output width, i.e., twice the 8-bit width of the display output system can be used. In this case, degradation of the luminance resolution is negligible.

An image display unit 24 and an operation input unit 25 are identical to those in FIG. 2. The operation of this embodiment is almost identical to that in FIG. 2 when viewed from the operator.

With the above arrangement, the luminance distribution can be adjusted by only the digital processing system without using luminance distribution adjustment using the analog circuit arrangement of the luminance distribution adjustment unit 22.

As compared with the first embodiment, the number of components can be reduced by the analog circuit arrangement. Processing is performed by programs, which can cope with sophisticated, special processing.

In this embodiment, 16-bit width data is used for high-precision intermediate processing, while 8-bit width data is used as the data used for display. These data widths can be freely set to match the data width finally required.

When specialized applications are required in which photographed high-precision data is preserved to the end of processing as much as possible to perform display and output operations with very high image quality, an output from the high-precision A/D converter 27 may be externally output.

In this case, since data is output as, e.g., 16-bit digital data, a high-precision luminance correction process is allowed in processing of the subsequent external device.

In each embodiment described above, the analog image sensing data is stored in the analog semiconductor memory 21. This data need not be immediately converted into digital data. The analog value may be directly output from the electronic image sensing apparatus to an external processor having advanced performance, e.g., a personal computer having an A/D converter and may be processed.

The image sensing data may be converted in the form of an analog value and output to the image display unit such as a CRT. In this case, an inexpensive existing signal conversion (processing) element can be used to arrange a circuit.

The analog semiconductor memory may be arranged as a detachable card-like cartridge. The analog semiconductor memory cartridge is loaded in a predetermined reader, and the image sensing data stored in the cartridge may be read out and processed.

This allows arranging an electronic image sensing apparatus having low power consumption. There can be realized an electronic image sensing apparatus which can be used for a long period of time at any place without paying attention to the service life of a battery.

In the above description, a so-called electronic still camera apparatus has been exemplified as the electronic image sensing apparatus. However, the present invention is not limited to this.

For example, the present invention is applicable to an electronic video camera for sensing a moving picture, a medical device for converting radiation as well as visible light into an electrical signal and outputting image data, and the like. The same effect as described above can be obtained.

The present invention is also applicable to an electronic scanner device for detecting and outputting printed matter as electronic image data.

In this case, as described above, in place of an arrangement using photoelectric conversion elements two-dimensionally arranged in an image sensing unit, an arrangement using photoelectric conversion elements one-dimensionally arranged in, e.g., a subscanning direction may be used. The signal format of the image sensing data itself output from the image sensing unit is the same as described above, to which the present invention can be readily applied.

As has been described above, according to the present invention, the image sensing data obtained from the image sensing unit is temporarily stored as an analog value in the analog semiconductor memory while maintaining the luminance resolution to some extent. The luminance distribution of all the image sensing data is appropriately adjusted on the basis of the luminance information of the stored image sensing data. As compared with the conventional case in which data is digitized at a relatively small bit width and its luminance distribution is adjusted, image data having a desired luminance distribution can be obtained without greatly degrading the luminance resolution.

With this arrangement, as in the photographic system using the silver halide film, an image sensing system having two opportunities of adjusting the exposure (luminance) can be constructed.

The image sensing data from the image sensing unit is temporarily stored in the analog semiconductor memory in the form of an analog value. The image sensing data can be read out at an arbitrary speed, as needed. Unlike the conventional case in which the image sensing data read from the image sensing unit at high speed is read with a delay, high-precision A/D converters and high-speed signal processors need not be used.

The power consumption of the entire apparatus can be reduced, and the circuit element cost can be reduced.

What is claimed is:

1. An electronic image sensing apparatus for photoelet-rically converting an optical image in an image sensing unit, processing the resultant analog image sensing data, and recording, displaying, outputting, or externally outputting the processed image sensing data, comprising:

an analog semiconductor memory for temporarily storing the image sensing data from said image sensing unit in the form of an analog value;

a processor for generating adjustment information for adjusting a luminance distribution of the entire image sensing data on the basis of luminance information of the image sensing data read out from said analog semiconductor memory; and a luminance distribution adjustment unit for adjusting the luminance distribution of the entire image sensing data from said analog semiconductor memory on the basis of the adjustment information generated by said processor.

2. An apparatus according to claim 1, wherein said processor writes adjustment information, generated from the image sensing data read out from said analog semiconductor memory, in said semiconductor analog semiconductor memory in correspondence with the image sensing data.

3. An electronic image sensing apparatus for photoelet-rically converting an optical image in an image sensing unit, processing the resultant analog image sensing data, and recording, displaying, outputting, or externally outputting the processed image sensing data, comprising:

an analog semiconductor memory for temporarily storing the image sensing data from said image sensing unit in the form of an analog value;

a processor for generating adjustment information for adjusting a luminance distribution of the entire image sensing data on the basis of luminance information of the image sensing data read out from said analog semiconductor memory; and a luminance distribution adjustment unit for receiving the analog image sensing data read out from said analog semiconductor memory, adjusting an amplitude of the image sensing data on the basis of an amplitude conversion characteristic corresponding to the adjustment information generated by said processor, and outputting, as an analog value, the image sensing data whose luminance distribution is adjusted.

4. An electronic image sensing apparatus for photoelet-rically converting an optical image in an image sensing unit, processing the resultant analog image sensing data, and recording, displaying, outputting, or externally outputting the processed image sensing data, comprising:

an analog semiconductor memory for temporarily storing the image sensing data from said image sensing unit in the form of an analog value;

a processor for generating adjustment information for adjusting a luminance distribution of the entire image sensing data on the basis of luminance information of the image sensing data read out from said analog semiconductor memory; and a luminance distribution adjustment unit for receiving the analog image sensing data read out from said analog semiconductor memory, adjusting an amplitude of the image sensing data by digitizing the image sensing data on the basis of an A/D conversion characteristic corresponding to the adjustment information generated by said processor, and outputting, as a digital value, the image sensing data whose luminance distribution is adjusted.

5. An electronic image sensing apparatus for photoelet-rically converting an optical image in an image sensing unit, processing the resultant analog image sensing data, and recording, displaying, outputting, or externally outputting the processed image sensing data, comprising:

an analog semiconductor memory for temporarily storing the image sensing data from said image sensing unit in the form of an analog value;

an A/D converter for A/D-converting the analog image sensing data from said analog semiconductor memory with high precision and outputting the converted data as a digital value; and a processor for generating adjustment information for adjusting a luminance distribution of the entire image sensing data on the basis of luminance information of the digital image sensing data output from said A/D converter, adjusting an amplitude of the image sensing data on the basis of an amplitude conversion characteristic corresponding to the adjustment information, and outputting, as a digital value, the image sensing data whose luminance distribution is adjusted.

6. An apparatus according to claim 1, wherein said processor generates the adjustment information for adjusting the luminance distribution of the entire image sending data on the basis of luminance data of the image sensing data which is contained in a predetermined luminance reference area.

7. An apparatus according to claim 6, further comprising:

an image display unit for displaying the image sensing data read out from said analog semiconductor memory; and an operation input unit for selecting and setting a luminance reference area used for generating the luminance information of the image sensing data displayed on said image display unit, the luminance reference area being used to generate the luminance information.

8. An apparatus according to claim 6, wherein said processor uses, as the luminance reference area, an exposure determination area used to automatically set exposure and contained in the image sensing data.

9. An apparatus according to claim 6, wherein said apparatus further comprises an operation input unit for selecting and setting a desired luminance range of the luminance distribution of the entire image sensing data, and said processor generates adjustment information for widening the luminance information, contained in the predetermined luminance range selected and set by said operation input unit, to a desired output luminance range.

* * * * *